US012106395B2

(12) United States Patent
Huang et al.

(10) Patent No.: US 12,106,395 B2
(45) Date of Patent: Oct. 1, 2024

(54) AUGMENTED REALITY SYSTEM AND OPERATION METHOD THEREOF

(71) Applicant: Acer Incorporated, New Taipei (TW)

(72) Inventors: Chih-Wen Huang, New Taipei (TW); Wen-Cheng Hsu, New Taipei (TW); Yu Fu, New Taipei (TW); Chao-Kuang Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 559 days.

(21) Appl. No.: 17/467,279

(22) Filed: Sep. 6, 2021

(65) Prior Publication Data
US 2022/0405984 A1   Dec. 22, 2022

(30) Foreign Application Priority Data

Jun. 18, 2021   (TW) .................... 110122339

(51) Int. Cl.
G06T 11/00   (2006.01)
G06T 7/73   (2017.01)
H04N 7/15   (2006.01)
H04W 4/029   (2018.01)

(52) U.S. Cl.
CPC ............. *G06T 11/00* (2013.01); *G06T 7/73* (2017.01); *H04N 7/157* (2013.01); *H04W 4/029* (2018.02); G06T 2207/30204 (2013.01)

(58) Field of Classification Search
None
See application file for complete search history.

(56) References Cited

U.S. PATENT DOCUMENTS

2017/0006080 A1* 1/2017 Fang ................. H04N 21/4402
2020/0143600 A1* 5/2020 Dai ........................ G06T 19/006
2021/0124180 A1* 4/2021 Amadio ............. G06K 7/10881

FOREIGN PATENT DOCUMENTS

CN   110415810   11/2019
TW   202020505   6/2020

* cited by examiner

Primary Examiner — Yanna Wu
(74) Attorney, Agent, or Firm — JCIPRNET

(57) ABSTRACT

An augmented reality (AR) system and an operation method thereof are provided. The AR system includes a target device and an AR device. The AR device captures the target device to generate a picture. The target device provides a digital content to the AR device. The AR device tracks the target device in the picture for an AR application. During the AR application, the AR device overlays the digital content on the target device in the picture.

12 Claims, 3 Drawing Sheets

AUGMENTED REALITY SYSTEM AND OPERATION METHOD THEREOF

CROSS-REFERENCE TO RELATED APPLICATION

This application claims the priority benefit of Taiwan application serial no. 110122339, filed on Jun. 18, 2021. The entirety of the above-mentioned patent application is hereby incorporated by reference herein and made a part of this specification.

BACKGROUND

Technical Field

The disclosure relates to a video system, and more particularly to an augmented reality (AR) system and an operation method thereof.

Description of Related Art

Various audio-visual streaming services have gained increasing popularity. Common audio-visual streaming services include video conferencing. In a video conference, a user A may show something to a user B far away through a communication network. For example, a mobile phone held by the user A is displaying an interesting digital content (a picture or a three-dimensional digital object), and the user A may want to show this digital content to the user B far away through the video conference. Therefore, the user A uses a video conferencing device to take a picture of this mobile phone. However, due to various environmental factors (such as resolution, color shift, or the like), the user B may not be able to see the content displayed by the mobile phone of the user A clearly.

SUMMARY

The disclosure provides an augmented reality (AR) system and an operation method thereof for an AR application.

In an embodiment of the disclosure, the AR system includes a target device and an AR device. The AR device is configured to capture the target device to generate a picture. The target device provides a digital content to the AR device. The AR device tracks the target device in the picture for the AR application. In the AR application, the AR device overlays the digital content on the target device in the picture.

In an embodiment of the disclosure, the operation method includes the following steps. A target device provides a digital content to an AR device. The AR device captures the target device to generate a picture. The AR device tracks the target device in the picture for the AR application. In the AR application, the AR device overlays the digital content on the target device in the picture.

Based on the above, the AR device in embodiments of the disclosure may capture the target device to generate the picture for the AR application. The target device may provide the digital content to the AR device. During the AR application, the AR device may overlay the digital content provided by the target device on the target device in the picture. Since the digital content is not fixedly stored in the AR device, the AR device may present AR effect in a more flexible manner.

In order to make the aforementioned features and advantages of the disclosure comprehensible, embodiments accompanied with drawings are described in detail below.

DESCRIPTION OF THE EMBODIMENTS

Throughout the text of the specification (including the claims), the term "couple (or connect)" refers to any direct or indirect connection means. For example, where a first device is described to be coupled (or connected) to a second device in the text, it should be interpreted that the first device may be directly connected to the second device, or that the first device may be indirectly connected to the second device through another device or some connection means. The terms "first," "second," and the like mentioned in the specification or the claims are used only to name the elements or to distinguish different embodiments or scopes, and are not intended to limit the upper or lower limit of the number of the elements, nor are they intended to limit the order of the elements. Moreover, wherever applicable, elements/components/steps referenced by the same numerals in the figures and embodiments refer to the same or similar parts. Elements/components/steps referenced by the same numerals or the same language in different embodiments may be mutually referred to for relevant descriptions.

Figure 1:
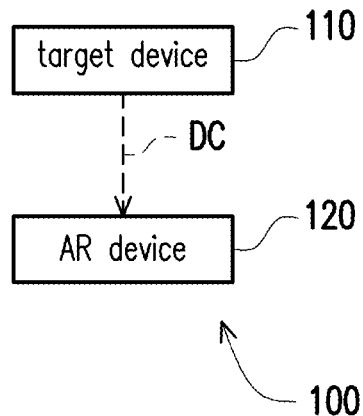
FIG. 1 is a schematic circuit block diagram of an augmented reality (AR) system according to an embodiment of the disclosure.

FIG. 1 is a schematic circuit block diagram of an augmented reality (AR) system 100 according to an embodiment of the disclosure. The AR system 100 shown in FIG. 1 includes a target device 110 and an AR device 120. A user may use the AR device 120 to capture the target device 110 to generate a picture. This embodiment does not limit the specific product category of the AR device 120 and the target device 110. For example, in some embodiments, the target device 110 may include a mobile phone, a smart watch, a tablet computer, or other electronic apparatuses, and the AR device 120 may include a local computer, a head-mounted display, and/or other AR devices.

Figure 2:
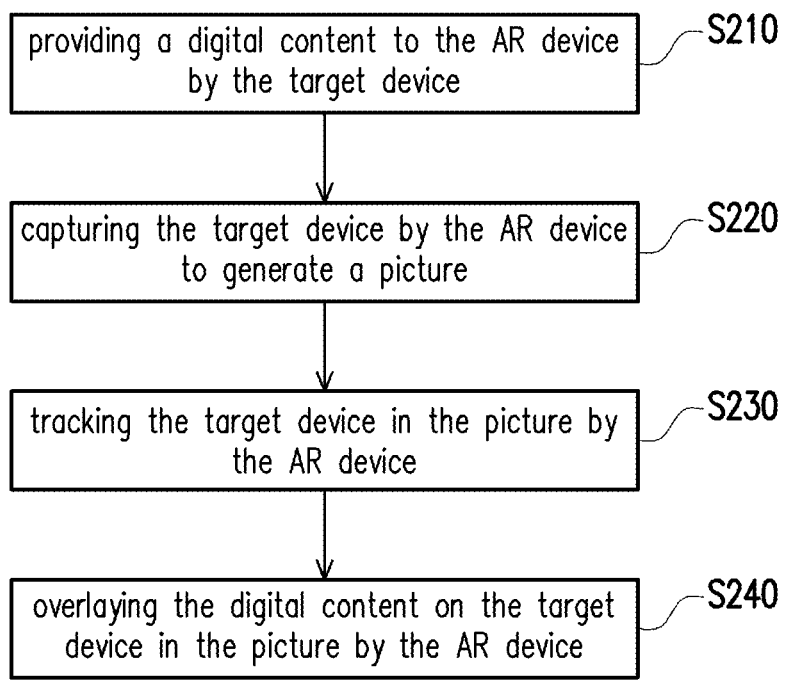
FIG. 2 is a schematic flow chart of an operation method of an AR system according to an embodiment of the disclosure.

FIG. 2 is a schematic flow chart of an operation method of an AR system according to an embodiment of the disclosure. With reference to FIG. 1 and FIG. 2, the AR device 120 may establish a communication connection with the target device 110 so that the target device 110 may provide a digital content DC to the AR device 120 (step S210). According to actual design, the communication connection may include Bluetooth, a Wi-Fi wireless network, a universal serial bus (USB), and/or other communication connection interfaces. The digital content DC may be set according to actual applications. For example, in some embodiments, the digital content DC may include a two-dimensional image frame, a three-dimensional digital object, and/or other digital contents. The two-dimensional image frame may include a photo, a video, or other image signals. The three-dimensional digital object may include a car, an animal, or other three-dimensional objects.

In step S220, the AR device 120 may capture the target device 110 to generate a picture (or a picture stream). In step S230, the AR device 120 may track the target device 110 in the picture for an AR application. According to actual design, the AR application may include a game application, an education application, a video conferencing application, and/or other applications. During the AR application, the AR device 120 may overlay the digital content DC provided by the target device 110 on the target device 110 in the picture (step S240). Therefore, the digital content DC may replace the target device 110 in the picture.

Figure 3:
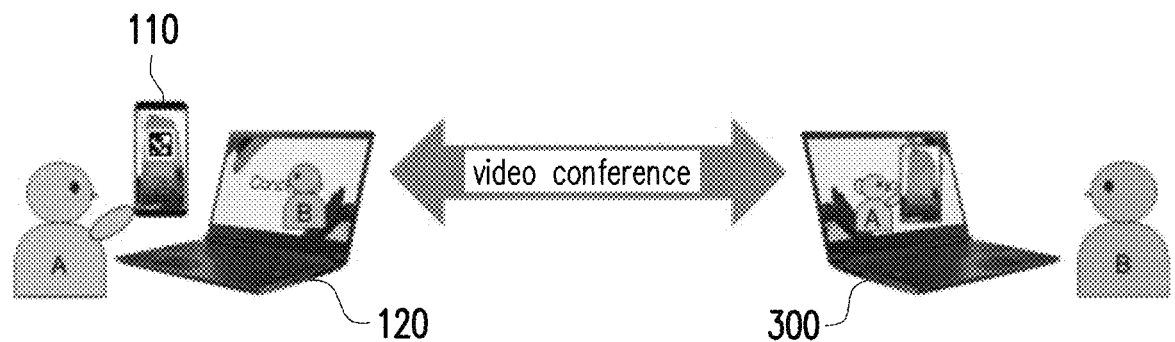
FIG. 3 is a schematic diagram of a scenario of an AR application according to an embodiment of the disclosure.

FIG. 3 is a schematic diagram of a scenario of an AR application according to an embodiment of the disclosure. In the embodiment shown in FIG. 3, the AR application may include a video conferencing application. With reference to FIG. 1 and FIG. 3, the AR device 120 may be connected to a remote device 300 through a communication network. According to actual design, the communication network may include Wi-Fi wireless network, Ethernet, Internet, and/or other communication networks. In the embodiment shown in FIG. 3, the target device 110 may include a smart phone, and the AR device 120 and the remote device 300 may include notebook computers. The AR device 120 may send a picture to the remote device 300 through the communication network for video conferencing.

In a video conference shown in FIG. 3, a user A may show something to a user B far away through the communication network. For example, the target device 110 held by the user A is displaying an interesting digital content (a picture or a three-dimensional digital object), and the user A may want to show the digital content to the user B far away through the video conference. Therefore, the user A uses the AR device 120 to capture the picture displayed by the target device 110. However, due to various environmental factors (such as resolution, color shift, or the like), the user B may not be able to clearly see the content captured by the AR device 120 and displayed by the target device 110.

Therefore, in the video conference (AR application), the target device 110 may provide the digital content DC being displayed to the AR device 120, and the AR device 120 may capture the target device 110 and the user A to generate a picture (here referred to as a conference picture). The AR device 120 may overlay the digital content DC on the target device 110 in the conference picture to generate an AR conference picture. The AR device 120 may transmit the AR conference picture to the remote device 300 through the communication network for video conferencing. The remote device 300 may display the AR conference picture to the user B. Since the digital content the target device 110 is displaying that the user B sees is not captured by the AR device 120, the digital content does not have issues such as resolution, color shift, or the like.

For example, based on the actual design, the digital content provided by the target device 110 to the AR device 120 may include a three-dimensional digital object, and the target device 110 has at least one attitude sensor (not shown in FIG. 1 and FIG. 3) to detect an attitude of the target device 110. For example, the attitude sensor may include an acceleration sensor, a gravity sensor, a gyroscope, an electronic compass, and/or other sensors. The target device 110 may provide attitude information corresponding to the attitude of the target device 110 to the AR device 120. The AR device 120 may capture the target device 110 to generate a picture (for example, a meeting picture) and overlay a three-dimensional digital object (the digital content DC) on the target device 110 in the picture. The AR device 120 may correspondingly adjust the attitude of the three-dimensional digital object in the picture based on the attitude information of the target device 110.

Figure 4:
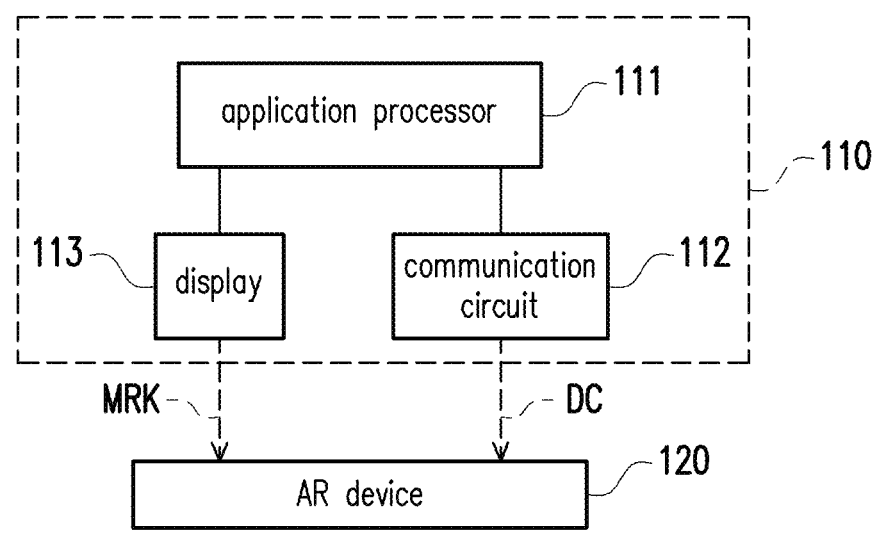
FIG. 4 is a schematic circuit block diagram of a target device according to an embodiment of the disclosure.

FIG. 4 is a schematic circuit block diagram of a target device 110 according to an embodiment of the disclosure. In the embodiment shown in FIG. 4, the target device 110 includes an application processor 111, a communication circuit 112, and a display 113. The application processor 111 is coupled to the communication circuit 112 and the display 113. The communication circuit 112 may establish a connection with the AR device 120 to provide the digital content DC. Based on the driving and control of the application processor 111, the display 113 may display a marker MRK. Based on actual design, the marker MRK may include an ArUco marker, a quick response (QR) code, or any predefined geometric figures. The AR device 120 may capture the marker MRK displayed by the display 113 to locate a position of the target device 110 in the picture.

Figure 5:
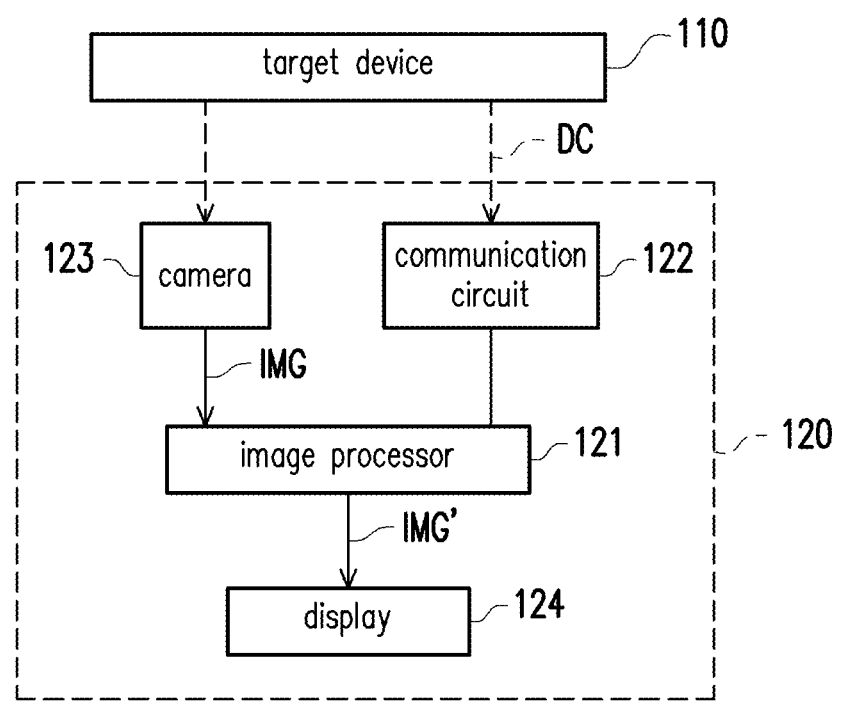
FIG. 5 is a schematic circuit block diagram of an AR device according to an embodiment of the disclosure.

FIG. 5 is a schematic circuit block diagram of an AR device 120 according to an embodiment of the disclosure. In the embodiment shown in FIG. 5, the AR device 120 includes an image processor 121, a communication circuit 122, a camera 123, and a display 124. The image processor 121 is coupled to the communication circuit 122, the camera 123, and the display 124. The communication circuit 122 may establish a connection with the target device 110 to receive the digital content DC. The camera 123 may capture the target device 110 to generate a picture IMG. The image processor 121 may locate a position of the target device 110 in the picture IMG. The image processor 121 may overlay the digital content DC on the target device 110 in the picture IMG to generate a picture IMG' that is overlaid. The display 124 is coupled to the image processor 121 to receive the picture IMG'. Based on the driving and control of the image processor 121, the display 124 may display the image IMG' overlaid with the digital content DC.

According to different design requirements, the application processor 111 and/or the image processor 121 may be implemented as hardware, firmware, software (i.e., a program), or a combination of many among the above three. In terms of hardware, the application processor 111 and/or the image processor 121 may be implemented at a logic circuit on an integrated circuit. Related functions of the application processor 111 and/or the image processor 121 may be implemented as hardware by using hardware description languages such as Verilog, HDL, or VHDL, or other suitable programming languages. For example, the related functions of the application processor 111 and/or the image processor 121 may be implemented at various logic blocks, modules, and circuits in one or more controllers, microcontrollers, microprocessors, application-specific integrated circuits (ASIC), digital signal processors (DSP), field programmable gate arrays (FPGA), and/or other processing units.

In terms of software and/or firmware, the related functions of the application processor 111 and/or the image processor 121 may be implemented as programming codes. For example, general programming languages such as C, C++, or assembly languages, or other suitable programming languages may be used to implement the application processor 111 and/or image processor 121. The programming codes may be recorded/stored in a non-transitory computer readable medium. In some embodiments, the non-transitory computer readable medium includes, for example, a read only memory (ROM), a tape, a disk, a card, a semiconductor memory, a programmable logic circuit, and/or a memory device. The memory device includes a hard disk drive (HDD), a solid-state drive (SSD), or other memory devices. A computer, a central processing unit (CPU), a controller, a microcontroller, or a microprocessor may read and execute the programming codes from the non-transitory computer readable medium, thereby implementing the related functions of the application processor 111 and/or the image processor 121. Moreover, the programming codes may also be provided to the computer (or the CPU) through any transmission medium (a communication network, a broadcast wave, or the like). The communication network is, for example, the Internet, a wired communication network, a wireless communication network, or other communication media.

In summary, the AR device 120 of the embodiments above may capture the target device 110 to generate the picture IMG for the AR application. The target device 110 may provide the digital content DC to the AR device 120. During the AR application, the AR device 120 may overlay the digital content DC provided by the target device 110 on the target device 110 in the picture IMG. Since the digital content DC is not fixedly stored in the AR device 120, the AR device 120 may present AR effect in a more flexible manner.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An augmented reality system, comprising:
   a target device; and
   an augmented reality device, configured to capture the target device to generate a picture, wherein the target device comprises a communication circuit configured to establish a connection with the augmented reality device to provide a digital content to the augmented reality device, the augmented reality device tracks the target device in the picture for an augmented reality application, and the augmented reality device overlays the digital content on the target device in the picture in the augmented reality application,
   wherein the target device further comprises a display configured to display the digital content,
   wherein the augmented reality device transmits the picture to a remote device through a communication network for a video conference in the augmented reality application.

2. The augmented reality system according to claim 1, wherein
   the display is configured to display a marker,
   wherein the augmented reality device captures the marker to locate a position of the target device in the picture.

3. The augmented reality system according to claim 2, wherein the marker comprises an ArUco marker.

4. The augmented reality system according to claim 1, wherein the augmented reality device comprises:

a communication circuit, configured to establish the connection with the target device to receive the digital content;
   a camera, configured to capture the target device to generate the picture; and
   an image processor, coupled to the communication circuit and the camera, wherein the image processor locates a position of the target device in the picture, and the image processor overlays the digital content on the target device in the picture.

5. The augmented reality system according to claim 4, wherein the augmented reality device further comprises:
   a display, coupled to the image processor and configured to display the picture overlaid with the digital content.

6. The augmented reality system according to claim 1, wherein the target device comprises a mobile phone, and the augmented reality device comprises a local computer.

7. An operation method of an augmented reality system, comprising:
   providing a digital content to an augmented reality device by a target device, wherein the target device comprises a communication circuit configured to establish a connection with the augmented reality device to provide the digital content;
   displaying the digital content by a display of the target device;
   capturing the target device by the augmented reality device to generate a picture;
   tracking the target device in the picture by the augmented reality device for an augmented reality application;
   overlaying the digital content on the target device in the picture by the augmented reality device in the augmented reality application; and
   transmitting the picture to a remote device through a communication network for a video conference by the augmented reality device in the augmented reality application.

8. The operation method according to claim 7, further comprising:
   displaying a marker by the display of the target device; and
   capturing the marker by the augmented reality device to locate a position of the target device in the picture.

9. The operation method according to claim 8, wherein the marker comprises an ArUco marker.

10. The operation method according to claim 7, further comprising:
    capturing the target device by a camera of the augmented reality device to generate the image;
    locating a position of the target device in the picture by an image processor of the augmented reality device; and
    overlaying the digital content on the target device in the picture by the image processor.

11. The operation method according to claim 10, further comprising:
    displaying the picture overlaid with the digital content by a display of the augmented reality device.

12. The operation method according to claim 7, wherein the target device comprises a mobile phone, and the augmented reality device comprises a local computer.

* * * * *